(12) United States Patent
Hidai et al.

(10) Patent No.: US 9,027,482 B2
(45) Date of Patent: May 12, 2015

(54) VEHICLE VIBRATION SUPPRESSION DEVICE

(75) Inventors: Masataka Hidai, Tokyo (JP); Kenjiro Goda, Tokyo (JP); Kiyoshi Morita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/343,222

(22) PCT Filed: Sep. 14, 2011

(86) PCT No.: PCT/JP2011/071046
§ 371 (c)(1),
(2), (4) Date: Mar. 6, 2014

(87) PCT Pub. No.: WO2013/038533
PCT Pub. Date: Mar. 21, 2013

(65) Prior Publication Data
US 2014/0238261 A1 Aug. 28, 2014

(51) Int. Cl.
*B61D 17/00* (2006.01)
*B61D 17/02* (2006.01)
*B61F 5/24* (2006.01)

(52) U.S. Cl.
CPC . *B61D 17/02* (2013.01); *B61F 5/24* (2013.01); *Y02T 30/32* (2013.01)

(58) Field of Classification Search
CPC ........ B61D 17/00; B61D 17/02; Y02T 30/32; B61F 3/14
See application file for complete search history.

(56) References Cited

U.S. PATENT DOCUMENTS

| 2,093,535 A | * | 9/1937 | Adams et al. | 105/1.1 |
| 4,455,045 A | * | 6/1984 | Wheeler | 296/181.5 |

(Continued)

FOREIGN PATENT DOCUMENTS

| CN | 1704862 A | 12/2005 |
| GB | 2 414 816 A | 12/2005 |

(Continued)

OTHER PUBLICATIONS

International Search Report (PCT/ISA/210) with English translation dated Dec. 20, 2011 (Six (6) pages).

(Continued)

*Primary Examiner* — Jason C Smith
(74) *Attorney, Agent, or Firm* — Crowell & Moring LLP

(57) ABSTRACT

There is provided an economical vehicle vibration suppression device capable of efficiently reducing a vortex with a smaller number of devices and controlling the speed of movement in a vehicle longitudinal direction of the vortex.
The vehicle vibration suppression device includes a pair of ducts, a pressure control device, and a control unit. The ducts, below a floor surface of a vehicle body, are mounted adjacent to at least a pair of bogies on which the vehicle body is mounted. The ducts are arranged in a direction perpendicular to a traveling direction of the vehicle body and mounted so as to penetrate through both side surfaces of the vehicle body. The pressure control device is mounted within each of the ducts and has openings, one of the openings serving as an intake port and the other opening serving as a discharge port. The pressure control device generates a pressure difference in each of the ducts. The control unit controls start and stop of suction performed by the pressure control device while determining a side surface of the vehicle to be subjected to the suction by the pressure control device on the basis of current distance information of the railway vehicle during currently traveling. The control unit suppresses vibration by driving the pressure control device and sucking a vortex caused by turbulence of air flow generated at a portion of the bogie when the railway vehicle passes through the tunnel.

8 Claims, 5 Drawing Sheets

(56) References Cited

U.S. PATENT DOCUMENTS

| | | | |
|---|---|---|---|
| 4,756,256 A * | 7/1988 | Rains et al. | 105/1.1 |
| 5,078,448 A * | 1/1992 | Selzer et al. | 296/180.2 |
| 2005/0139115 A1* | 6/2005 | Harada et al. | 105/1.1 |
| 2011/0297035 A1* | 12/2011 | Langerwisch et al. | 105/1.1 |
| 2013/0133545 A1* | 5/2013 | Schober et al. | 105/1.1 |
| 2013/0239844 A1* | 9/2013 | Schober et al. | 105/1.2 |
| 2013/0291758 A1* | 11/2013 | Orellano et al. | 105/1.1 |
| 2013/0291759 A1* | 11/2013 | Orellano et al. | 105/1.1 |
| 2014/0152050 A1* | 6/2014 | Zhu | 296/180.1 |
| 2014/0238261 A1* | 8/2014 | Hidai et al. | 105/1.2 |

FOREIGN PATENT DOCUMENTS

| | | |
|---|---|---|
| JP | 58-168960 U | 11/1983 |
| JP | 61-115767 A | 6/1986 |
| JP | 5-270402 A | 10/1993 |
| JP | 2002-53037 A | 2/2002 |
| JP | 2005-205947 A | 8/2005 |
| JP | 2005-343294 A | 12/2005 |
| JP | 2007-131204 A | 5/2007 |
| JP | 2007-168508 A | 7/2007 |

OTHER PUBLICATIONS

M. Suzuki, et al., "Reduction of Fluctuating Airflow on a Vehicle Traveling in a Tunnel", Special Feature: The Boundary Region in Railway Technology, RRR, May 2010 issue, (Four (4) pages).

* cited by examiner

VEHICLE VIBRATION SUPPRESSION DEVICE

TECHNICAL FIELD

The present invention relates to a railway vehicle including a flow control device, and more particularly, to a vehicle vibration suppression device suitable for use in the railway vehicle.

BACKGROUND ART

For example, in high-speed vehicles such as Shinkansen, there is a need to ensure ride comfort without deteriorating the comfortability of the passengers even during high speed traveling.

For example, as shown in FIG. 9, when a high-speed vehicle, such as Shinkansen, travels in a tunnel section, a vortex is generated at a wall side of the tunnel. A yaw moment and a translational exciting force in a lateral direction, which are caused by pressure fluctuation due to the vortex, are imparted to a vehicle body, leading to an increase in the vibration of the vehicle body. This is already known, for example, in Non-patent Literature 1 below.

Furthermore, as also shown in FIG. 10, in general, when comparing the acceleration responses in the lateral direction of the vehicle body in a tunnel section and in a non-tunnel section, the response, particularly in the tunnel section, tends to rise in the vicinity of 2 Hz. Because the human sensitivity to such acceleration in the lateral direction is high especially in a low-frequency region, the acceleration in the lateral direction in the vicinity of 2 Hz generated in the tunnel section as described above has been a major problem for riding quality of the vehicle.

As a solution to such problem, in the Non-Patent Literature 1 below, there are already proposed and put in practical use a method in which an actuator is disposed laterally between a vehicle body and a bogie to damp vibration by generating a force in a direction opposite to the yaw moment exciting force caused by pressure fluctuation, and further, a method in which a so-called inter-vehicle longitudinal damper is provided between adjacent vehicles to damp vibration by dissipating energy caused by the yaw moment exciting force.

It should be noted that, in these methods already in practical use, the yaw moment, which is the source of the vehicle vibration while traveling in a tunnel, and the lateral translational exciting force itself are not reduced. Therefore, in the case where the source of the vehicle vibration is not cut off, the above-described exciting force becomes excessive. In this case, the problem is that the vehicle vibration reducing effect is small.

To address this problem, according to the above-described Non-Patent Document 1, a method is also proposed, in which a jet device is disposed on a side surface of the vehicle to reduce the yaw moment exciting force by directing a jet horizontally onto a wall of the tunnel during traveling in a tunnel.

Furthermore, in addition to the above, the following Patent Literatures 1 and 2 each disclose a construction for preventing a vortex generated under the floor of a vehicle from being swirled up around a side surface of the vehicle, which is different from the above-described construction in which a jet flow is used.

CITATION LIST

Patent Literature

Patent Literature 1: Japanese Unexamined Patent Application Publication No. 2002-53037
Patent Literature 2: Japanese Unexamined Patent Application Publication No. 2005-205947

Non-Patent Literature

Non-Patent Literature 1: RRR, May 2010 issue, Special Feature: The Boundary Region in Railway Technology, "Reduction of Fluctuating Airflow on a Vehicle Traveling in a Tunnel", Masahiro Suzuki and two others

SUMMARY OF INVENTION

Technical Problem

Especially in the method disclosed in the above-described Non-Patent Literature 1, the jet device capable of directing a jet onto a side surface of the vehicle is provided. A plurality of the jet devices are arranged in a vehicle longitudinal direction at lower portions of the bottom of the vehicle on the wall side of the tunnel. That is, this construction is intended to control the turbulence of air flow around the vehicle by directing a jet horizontally onto a wall of the tunnel during traveling in the tunnel and thereby reduce a yaw moment exciting force on the vehicle.

However, the jet device having the above-described construction has the following problems:

(1) Although a vortex generated at a wall side of the tunnel to cause vehicle vibration can be kept away from the side surface of the vehicle by directing a jet onto the tunnel wall, the generated vortex itself is not reduced.

(2) Further, the above-described construction is intended to control the turbulence of air flow by jet and it is not intended to control the speed at which a vortex generated on the side facing the tunnel wall moves in the vehicle longitudinal direction.

It should be noted that, in a tunnel section, the above-described vortex moving in the vehicle longitudinal direction causes the vehicle to vibrate in a translational direction at a position of a passing point when passing through a side surface of the vehicle. In general, as a principle of vehicle body vibration, the sum of the exciting forces in the translational direction applied to each position on the side surface of the vehicle is applied, as a translational force, to the center of gravity of the vehicle body, and the sum of the moments in a yaw direction is applied as a torque about the center of gravity of the vehicle body, thereby generating vehicle body vibration.

It should be noted that, according to the above-described principle, when the moving speed of the vortex is changed, the speed of movement of the translational force in the longitudinal direction on the side surface of the vehicle is changed and vibration timing is changed. Thus, a translational force to be applied to the center of gravity of the vehicle body, that is, a yaw moment amount, is also changed. It is therefore necessary to optimize the moving speed of the vortex, in addition to controlling the turbulence of air flow.

Additionally, (3) because the jet is directed onto the tunnel wall from a side surface of the vehicle where the horizontal distance to the tunnel wall is relatively short, out of the side surfaces of the vehicle, when it is assumed that the vehicle travels on the up or down line in a double-track tunnel, it is necessary to provide the above-described jet device on both side surfaces of the vehicle. This causes a problem of an increase in the number of devices provided on the vehicle.

As a result, in the above-described related art, particularly in the jet device disclosed in the above Non-Patent Literature 1, it is necessary to provide a number of jet devices for reducing a vortex generated at a wall side of the tunnel, which mainly causes vehicle body vibration in a tunnel section, and therefore an efficient and economical vehicle vibration suppression device cannot be achieved.

Accordingly, the present invention has been achieved in view of the problems of the above-described related art, and more specifically, an object of the present invention is to provide a vehicle vibration suppression device capable of efficiently reducing a vortex with the minimum number of devices and controlling the speed of movement of the vortex in a vehicle longitudinal direction.

Solution to Problem

In order to achieve the above-mentioned object, according to the present invention, firstly, there is provided a vehicle vibration suppression device for suppressing vibration of a vehicle body generated when a railway vehicle passes through a tunnel. The vehicle vibration suppression device includes: a pair of ducts, a pressure control device, and a control unit. The ducts, below a floor surface of the vehicle body, are mounted adjacent to at least a pair of bogies on which the vehicle body is mounted. The ducts are arranged in a direction perpendicular to a traveling direction of the vehicle body and mounted so as to penetrate through both side surfaces of the vehicle body. The pressure control device is mounted within each of the ducts and has openings, one of the openings serving as an intake port and the other opening serving as a discharge port. The pressure control device generates a pressure difference in each of the ducts. The control unit controls start and stop of suction performed by the pressure control device while determining a side surface of the vehicle to be subjected to the suction by the pressure control device on the basis of current distance information of the railway vehicle during currently traveling. The control unit suppresses vibration by driving the pressure control device and sucking a vortex caused by turbulence of air flow generated at a portion of the bogie when the railway vehicle passes through the tunnel.

It should be noted that, according to the present invention, in the above-described vehicle vibration suppression device, the control unit includes means for preliminarily processing and storing in database information on a side surface of the vehicle to be subjected to suction operation by the pressure control device along with distance information of a tunnel section. Also, preferably, the control unit determines a side surface of the vehicle to be subjected to the suction when the railway vehicle passes through the tunnel and controls start and stop of the suction by collating the current distance information with the information processed into the database. Further, preferably, the pressure control device is composed of a plurality of blades mounted around a rotating shaft and includes an electric motor for rotationally driving the rotating shaft. In addition, preferably, the vehicle vibration suppression device further includes a drive circuit for controlling rotational drive of the electric motor, wherein the control unit determines a side surface of the vehicle to be subjected to suction operation by the pressure control device and controls start and stop of the suction by controlling a rotating direction of the electric motor with the drive circuit.

In the same manner, according to the present invention, in order to achieve the above-mentioned object, there is provided a vehicle vibration suppression device for suppressing vibration of a vehicle body generated when a railway vehicle passes through a tunnel, the vehicle having an underfloor device disposed under a floor of the vehicle body, the underfloor device requiring cooling. The vehicle vibration suppression device includes: a pair of ducts, a pressure control device, and a control unit. The pair of ducts, below a floor surface of the vehicle body, are mounted adjacent to at least a pair of bogies on which the vehicle body is mounted. One of the ducts has openings, one opening being mounted to one side surface of the vehicle body and the other opening being mounted so as to face the underfloor device disposed under the floor of the vehicle body. The other duct has openings, one opening being mounted to the other side surface of the vehicle body and the other opening being mounted so as to face the underfloor device disposed under the floor of the vehicle body. The pressure control device is mounted within each of the ducts for generating a pressure difference in each of the ducts. The control unit controls start and stop of suction performed by the pressure control device while determining a side surface of the vehicle to be subjected to the suction by the pressure control device on the basis of current distance information of the railway vehicle during currently traveling. The control unit suppresses vibration by driving the pressure control device and sucking a vortex caused by turbulence of air flow generated at a portion of the bogie when the railway vehicle passes through the tunnel. It should be noted that, in this case, preferably, the vehicle vibration suppression device includes a drive circuit for controlling rotational drive of the electric motor, wherein the control unit determines a side surface of the vehicle to be subjected to suction operation by the pressure control device and controls start and stop of the suction by controlling start and stop of the electric motor with the drive circuit.

Advantageous Effects of Invention

That is, compared with the related art, the present invention described above exhibits an advantageous effect of providing an economically-excellent vehicle vibration suppression device capable of efficiently reducing a vortex with a smaller number of devices and controlling the speed of movement of the vortex in a vehicle longitudinal direction.

DESCRIPTION OF EMBODIMENTS

Hereinafter, embodiments of the present invention will be described in detail with reference to the accompanying drawings.

First Embodiment

Firstly, a first embodiment (First Embodiment) of the present invention will be described in detail with reference to FIGS. 1 to 5.

Figure 1:
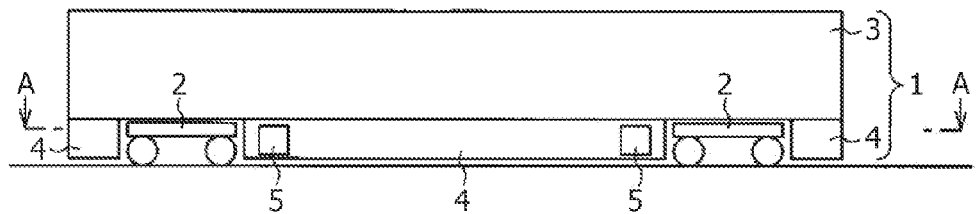
FIG. 1 shows a side view of a railway vehicle provided with a vehicle vibration suppression device according to a first embodiment of the present invention.

Referring to attached FIG. 1, a railway vehicle provided with a vehicle vibration suppression device according to the first embodiment of the present invention is composed mainly of a vehicle body 1 and a bogie 2 that carries the vehicle body. Further, the vehicle body 1 is composed mainly of a body structure 3 and a cover 4 that extends at a lower portion of a floor surface of the vehicle body. Furthermore, underfloor equipment is installed on a lower surface of the body structure 3, that is, in a lower portion of the floor surface of the vehicle body, and the cover 4 is mounted in such a manner as to surround (cover) the underfloor equipment. It should be noted that a vehicle vibration suppression control device (hereinafter merely referred to as "flow control device") according to the present invention, serving as a portion of the underfloor equipment, is installed in a lower portion of the floor surface of the vehicle body.

Figure 2:
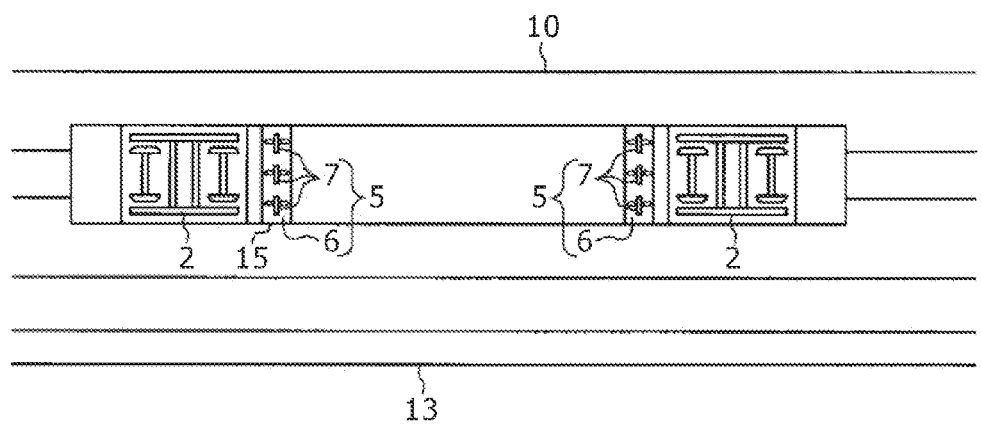
FIG. 2 is a sectional view of the railway vehicle taken along line A-A.

FIG. 2 shows a sectional view of the above-described railway vehicle shown in FIG. 1 taken along line A-A, and in particular, a sectional view of the vehicle while traveling in a tunnel. That is, wall surfaces of a tunnel in which the vehicle travels are denoted by reference signs 10 and 13.

Referring to FIG. 2, the flow control device 5 is composed mainly of a duct 6 and a pressure control device 7. The duct 6 is disposed at a position of the lower surface of the body structure 1 where it does not interfere with other underfloor equipment, in a direction perpendicular to a vehicle traveling direction, that is, so that it is aligned in the direction in which railroad ties of a track (rail) extend. Also, the duct 6 is mounted so as to penetrate through the cover 4 on both sides of the vehicle. Furthermore, intake and exhaust ports of the duct 6 are disposed on both side surfaces of the vehicle below the floor surface of the vehicle body 1 (see FIG. 1 above), at a position close to the bogie 2 in a vehicle longitudinal direction as possible.

It should be noted that, in this embodiment, a pair of the ducts 6 are provided corresponding to a pair of the bogies 2 that are provided at lower portions of the body structure 1 of the vehicle. That is, the pair of ducts 6 is arranged adjacent to each other within a space between the pair of bogies 2. For example, when the vehicle travels toward the right side in the figure, the ducts 6 are arranged, in the vehicle traveling direction, immediately behind one (on the right) of the bogies 2 and immediately in front of the other (on the left) of the bogies 2. It should be noted that positions where the pair of ducts 6 are to be arranged are not limited to the above-described positions. Alternatively, for example, the pair of ducts 6 may be arranged outside of the pair of bogies 2 in the vehicle traveling direction, or the arrangement may be such that one of the ducts 6 is disposed inside a corresponding one of the pair of bogies 2 and the other of the ducts 6 is disposed outside a corresponding one of the pair of bogies 2. In short, it is enough if these ducts 6 are arranged adjacent to the bogies 2 constituting the vehicle.

Further, the pressure control device 7 is disposed inside each of the ducts 6. The pressure control device 7 is composed of a plurality of blades mounted around a shaft rotated, for example, by an electric motor (shown in FIG. 3) rotatable at a high speed. It should be noted that, as is clear from the figure, the rotating shaft of the plurality of blades constituting the pressure control device 7 is also disposed in a direction perpendicular to the vehicle traveling direction, that is, so that it is aligned in the direction of the railroad ties of the track (rail). That is, the plurality of blades constituting the pressure control device 7 are fixed around the rotating shaft, and thus rotated at a high speed by rotationally driving the rotating shaft, causing a pressure difference (level difference) in a penetrating direction of the ducts 6 (upward or downward direction in FIG. 2), so that air moves from one side surface to the other side surface of the vehicle.

Figure 3:
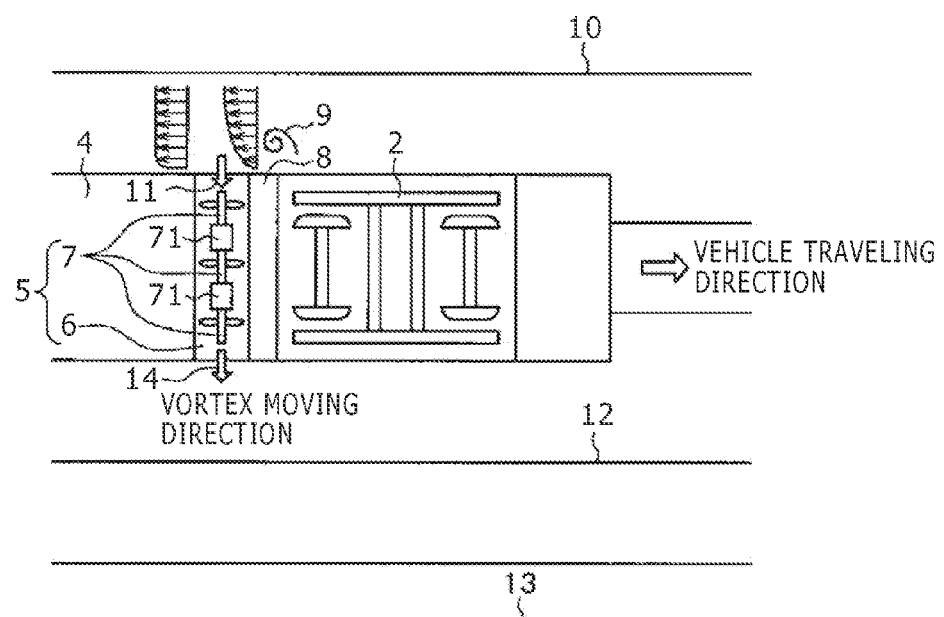
FIG. 3 is a partially enlarged view showing the details of a bogie and its surroundings of the railway vehicle.

Next, the operation of the flow control device 5 according to the present invention will be described with reference to FIG. 3. It should be noted that FIG. 3 is an enlarged view of the sectional view shown in FIG. 2, particularly showing the bogie 2 and its surroundings.

As indicated by an arrow in the figure, when the vehicle is traveling toward the right side of the drawing sheet (see a white arrow in the figure), air on the side of the wall surface 10 of the tunnel opposed adjacently to the vehicle collides with the cover 4, particularly, for example, a corner that is a portion 28 of the cover, thereby causing turbulence of air flow. The turbulence of air flow causes the generation of a vortex 29 (see a solid line in the figure). It should be noted that the generated vortex 9 is moved rearward (to the left side in the figure) along the side surface of the vehicle by flow speed in the vicinity of a boundary layer.

On the other hand, with the flow control device 5, the blades are rotated at a high speed by the above-described pressure control device 7, that is, the rotating shaft, thereby making the pressure at a portion 11 inside the duct 6 lower than the atmospheric pressure on the side surface of the vehicle. Thus, as shown by white arrows in FIG. 3, the vortex 9 generated by collision of air with the portion 28 of the cover is sucked into the duct 6, and then passes through the duct 6 to be discharged to the center side of the tunnel. By this operation, the vortex 9 generated on the side surface opposed adjacently to the wall surface of the tunnel, which mainly causes vehicle body vibration, can be reduced. It should be noted that, in this figure, as an example, the electric motor for rotationally driving at a high speed is shown, by reference sign 71, at one end of the rotating shaft mounted circumferentially with the plurality of blades constituting the pressure control device 7 (in this embodiment, inserted in series among three adjacent rotating shafts). It should be noted that, in the present invention, the construction of the pressure control device 7 is not limited to the above-described example, and it will be readily apparent to those skilled in the art that it is possible to adopt other constructions, as long as a desired function (that is, air-intake function) can be achieved.

Further, with the above-described structure of the flow control device 5, the pressure at the portion 11 inside the duct 6 is reduced. Thus, the flow speed distribution of air on the side surface of the vehicle is changed, and particularly, the flow speed in the vicinity of the boundary layer with the side surface of the vehicle body is increased. When observed from the side of the vehicle (train), the speed of movement of the vortex 9 to the rear of the vehicle (train) is also increased accordingly, which is equivalent to an increase in the speed of movement of the vortex 9 in the same direction as the traveling direction of the vehicle (train) when observed from the ground. It is already known that the moving speed of the vortex 9 is generally lower than train speed.

Figure 4:
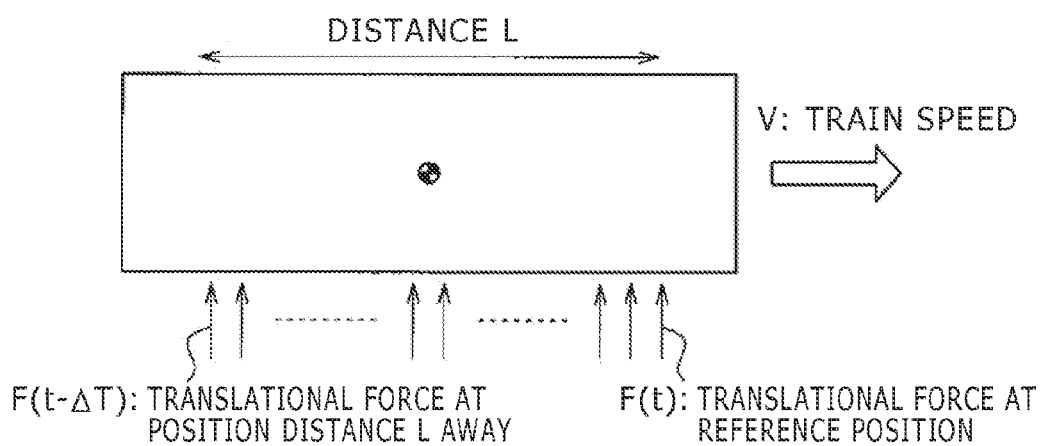
FIG. 4 shows a diagram for explaining a state in which a translational exciting force is applied to a side surface of a vehicle body when the railway vehicle passes through a tunnel.

Next, FIG. 4 attached herewith is a schematic diagram showing a state of the vehicle body when a translational exciting force is applied to a side surface of the vehicle body. It should be noted that, in this figure, the translational force applied to a reference position (a forward position of the vehicle in the traveling direction) of the side surface of the vehicle body by the above-described vortex 9 is referred to as F(t). Then, a translational force F (t−ΔT) delayed in phase by time ΔT relative to the above-described reference position is applied at a position rearward in the train traveling direction (see the white arrow in the figure) from the reference position by a distance L, and this time difference ΔT is expressed by distance L/(train speed−vortex moving speed). For example, assuming that the moving speed of the vortex is zero, that is, the vortex is stopped with respect to the ground, the time difference when the train passes through the position of the vortex is expressed by distance L/train speed.

Here, when the moving speed of the vortex becomes high, the relative speed between the train and the vortex is reduced, resulting in an increase in the time difference ΔT. Also, this increase in the ΔT causes a change in translational force phase difference, that is, a reduction in the sum of the yaw moments about the center of gravity of the vehicle body caused by the exciting force applied to each position on the side surface of the vehicle. Thus, vehicle body vibration is reduced, thereby allowing an improvement in riding quality in the lateral direction.

In addition, with the vehicle vibration suppression device including the above-described flow control device 5, as for the positions for arranging the flow control devices 5, the flow control devices 5 are disposed only in the immediate vicinity of the two bogies 2 in the vehicle traveling direction, in which a vortex is generated between the vehicle and the wall surface of the tunnel, thereby allowing effective suction. That is, the need to provide the devices as many as possible in the vehicle traveling direction as in the above-described related art is eliminated. For example, the number of devices to be arranged may depend on the number of the bogies 2, which is also economically preferable. Further, the suction can be performed from any side surface of the vehicle only by changing the rotating direction of the blades of the pressure control device 7 between forward and reverse directions. Therefore, it is unnecessary to provide the device on both side surfaces of the vehicle, and the vehicle vibration suppression device is more economical and efficient than the related art.

Meanwhile, in above FIG. 3, the description has been made in terms of the case where the vehicle travels toward the right side in the figure in a tunnel section. However, if the train traveling directions of the up and down lines are reversed, the train of above FIG. 3 travels on a track (rail) 12 toward the left side in the figure. In this case, the vortex, which mainly causes vehicle body vibration, is generated on a side surface of the vehicle where the horizontal distance to the tunnel wall surface is relatively short, that is, the side surface opposed adjacently to the wall surface 13 of the tunnel.

In such a case, the flow control device 5 performs the above-described suction from the vehicle side surface opposed adjacently to the wall surface 13 of the tunnel by reversing the rotating direction of the blades constituting the pressure control device 7. In this manner, with the above-described flow control device 5, it is possible to perform the above-described suction from any side surface of the vehicle by alternately reversing the rotating direction of the blades constituting the pressure control device 7.

That is, with this construction, even if the vehicle traveling direction is reversed, for example, as for the vortex generated in a portion 15 shown in above FIG. 2, the flow control device 5 disposed in its vicinity can immediately suck the vortex generated between the wall surface 13 of the tunnel and the side surface of the vehicle (train) opposed adjacently to the wall surface 13 of the tunnel and move it to the other side. It should be noted that, because this state is equal to moving the vehicle (train) shown in above FIG. 3 onto the track (rail) 12 on the opposite side by reversing its traveling direction, it is apparent that the same advantages as the operation described in above FIG. 3 can be obtained even if the vehicle travels reversely in a tunnel in the same manner.

It should be noted that, as is clear from the above, in order to achieve the above-described advantages of the present invention, the suction on a side surface of the vehicle by the pressure control device 7 of the flow control device 5 is required to be performed on a side surface where the horizontal distance to the tunnel wall surface is relatively short, out of both side surfaces of the vehicle. On the other hand, in general, in an open section (non-tunnel section), the exciting force due to the above-described vortex is likely to be smaller than that in a tunnel section, and therefore the suction is unnecessary. From the above fact, in a tunnel section, suction is required to be performed from the side surface of the vehicle where the horizontal distance to the tunnel wall surface is relatively short, and in an open section, no suction is required. The control of the flow control device 5, particularly, an example for achieving the control of the pressure control device 7, is shown in attached FIG. 5.

Figure 5:
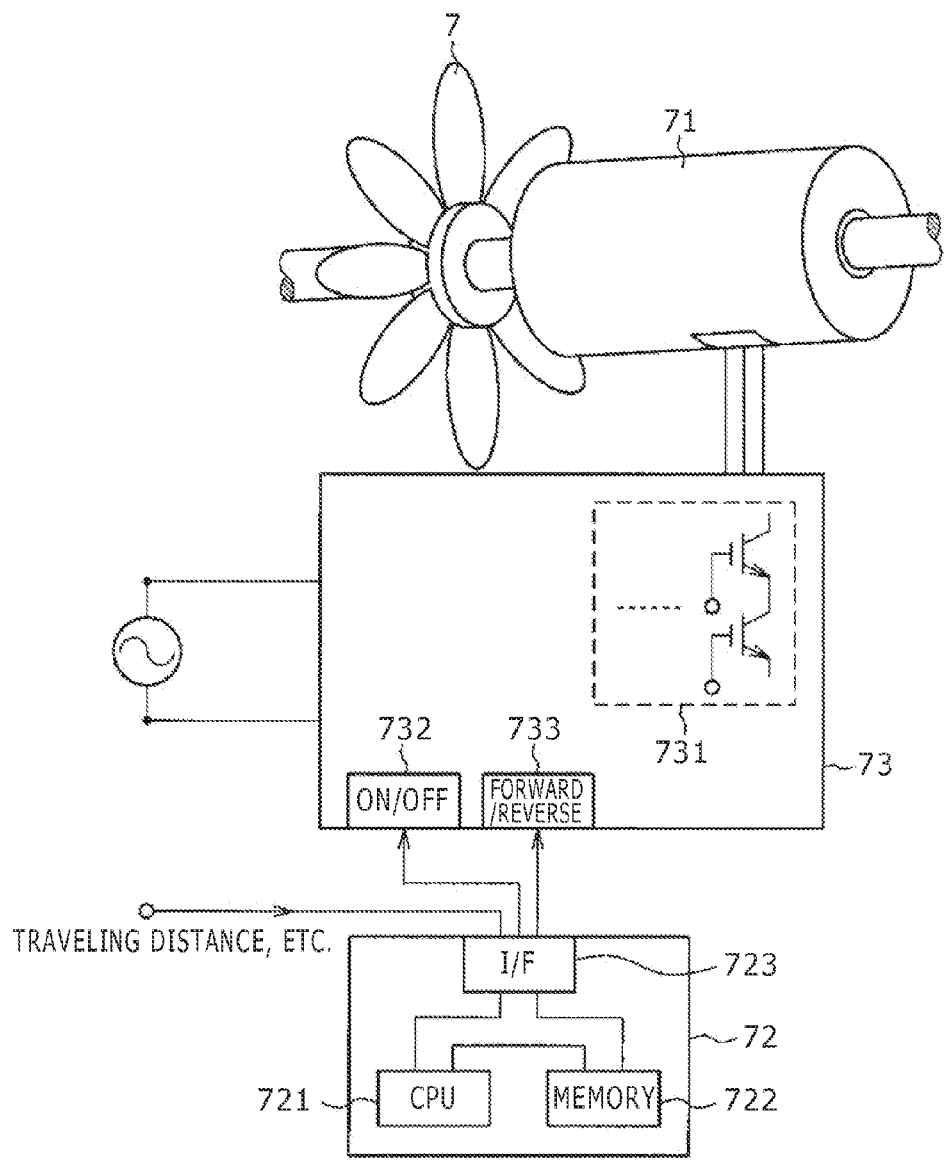
FIG. 5 is a circuit configuration diagram showing an example of a control unit for achieving the control of a pressure control device constituting the vehicle vibration suppression device.

FIG. 5 shows, as an example, a control unit 72 for controlling the operation of the above-described pressure control device 7, particularly for controlling, within the duct 6, the rotating direction and rotation period (the start and end of rotation) of the electric motor for rotating at a high speed the rotating shaft of the pressure control device 7 mounted circumferentially with the plurality of blades, and a drive circuit 73 for supplying electric power (including electric current, voltage, and frequency) necessary for the electric motor 71. It should be noted that as also shown in the figure, the control unit 72 includes, for example, a CPU 721, a memory 722, and an I/F unit 723 which are interconnected by a database, and, through the I/F unit 723, instructs the start and end of rotating operation along with a rotating direction to the drive circuit for the electric motor to be also described later.

That is, information (such as information on up and down lines) on the side surface of the vehicle on which the above-described suction operation is to be performed is preliminarily inputted from the outside through the I/F unit 723 and processed into a database together with kilometer information of a tunnel section (such as information on a distance from a starting point). Then a current traveling distance (distance information) of the train is inputted through the I/F unit 723, and the CPU 721 compares/collages it with the above-described information stored in the memory 722, thereby determining the timing to start the above-described suction operation (that is, timing to enter a tunnel) and then determining the timing to stop the operation (that is, timing to leave the tunnel). Also, at the same time, a side surface of the vehicle (for example, the left side in the vehicle traveling direction) on which the suction operation is to be performed is determined. Furthermore, on the basis of these determinations, the CPU 721 produces control/command signals and inputs them to the drive circuit 73 through the I/F unit 723. The drive circuit 73 includes: for example, an inverter 731 composed of an photovoltaic element such as an IGBT; an ON/OFF unit 732 composed of a control circuit, not shown, that performs control to drive the inverter 731, for controlling the start and stop of the electric motor 71; and a forward/reverse setting unit 733 for setting the rotating direction of the electric motor to the forward or reverse direction.

That is, with the constructions of the pressure control device 7 and the control unit thereof, by collating the traveling distance information, serving as currently-traveling position detection information, with the information preliminarily processed into a database during traveling of the train, the flow control device 5 can be driven only in a tunnel section and a side surface of the vehicle on which the suction is to be performed by the pressure control device 7 can be properly determined. Thus, it is possible to reduce vehicle body vibration by the above-described suction and improve the riding comfortableness of the passengers in the vehicle.

It should be noted that, while in the above-described embodiment, advantages of the flow control device 5 have been described only in the terms of the reduction of vehicle body vibration in a tunnel section, the present invention is not limited thereto, but can be also used in infrastructure (hereinafter abbreviated as "infra") such as stations or windbreak walls. In this case, in the above-described example, it is described that information, such as distance information and information on up and down lines, is preliminarily processed into a database, and a starting time point of the suction, along with a side surface of the vehicle body on which the suction is to be performed, is determined referring to information on current traveling distance. Alternatively, depending on features of the infrastructure, for example, in the case of sucking a vortex generated on one side relatively close to a facing surface of the infrastructure, the determination may be made, for example by image processing using an image signal from an image sensor, a proximity sensor or the like.

As described in detail above, with the vehicle vibration suppression device according to the above-described first embodiment of the present invention, it is possible to economically and efficiently achieve an improvement in the riding quality of a vehicle with a smaller number of flow control devices.

Second Embodiment

Next, a second embodiment (Second Embodiment) of the present invention will be described with reference to attached FIGS. 6 to 8. It should be noted that in the second embodiment, as compared with the above-described first embodiment, the exhaust port of the duct 6 is disposed at a position different from that in the above example so that the vortex is utilized as cooling air for the underfloor device.

Figure 6:
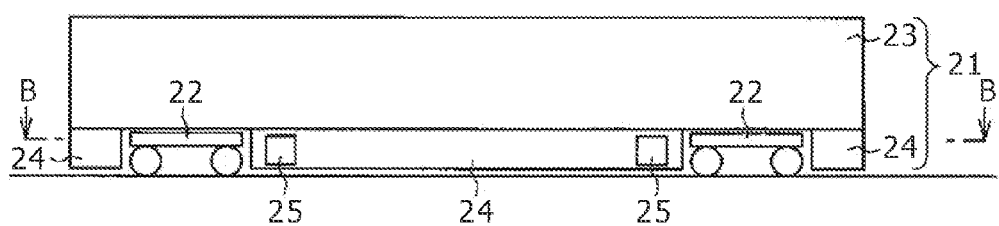
FIG. 6 is a side view of a railway vehicle provided with a vehicle vibration suppression device according to a second embodiment of the present invention.
Figure 7:
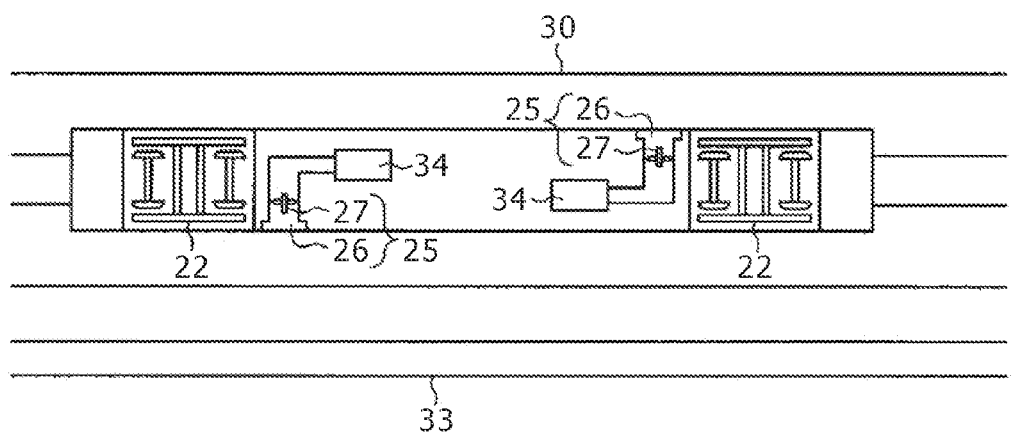
FIG. 7 is a sectional view of the railway vehicle taken along line B-B.

Firstly, as shown in FIGS. 6 and 7, in a railway vehicle according to the second embodiment, a flow control device 25 is composed mainly of a duct 26 bent into an L-shape and a pressure control device 27. It should be noted that the L-shaped duct 26 is disposed under a floor of a body structure 23, in the same manner as the above-described first embodiment.

Furthermore, referring to these figures, each of the two L-shaped ducts 26 disposed under the floor of the body structure 23 has an intake port. The intake port of the duct on the right side in the figure (in the vehicle traveling direction) is disposed in the side surface of the vehicle facing a wall surface 30 of the tunnel, and the intake port of the other duct is disposed in the side surface of the vehicle facing a wall surface 33 of the tunnel opposite from the wall surface 30. Further, each of these intake ports is disposed in the side surface of the vehicle below the floor surface, at a position as close (adjacent) to the corresponding bogie in the vehicle longitudinal direction as possible, in the same manner as the above-described first embodiment. However, on the other hand, as is clear from the figure, each of the L-shaped ducts 26 has an exhaust port that is disposed below a floor surface of the vehicle so as to face underfloor device 34 installed at a lower portion of the floor surface of the vehicle body.

Further, the pressure control device 27 composed of a plurality of blades mounted around a shaft rotated by an electric motor rotatable at a high speed is disposed within the L-shaped duct 26, in the same manner as the above-described first embodiment. It should be noted that while the rotating shaft of the pressure control device 27 is also disposed so that it is aligned in the direction of the railroad ties of the track (rail), the pressure control device 27 in this embodiment is composed of the plurality of blades mounted around the shaft rotated by the single electric motor 271 rotatable at a high speed.

Next, the operation of the flow control device 25 according to the second embodiment of the present invention will be described with reference to FIG. 8.

Figure 8:
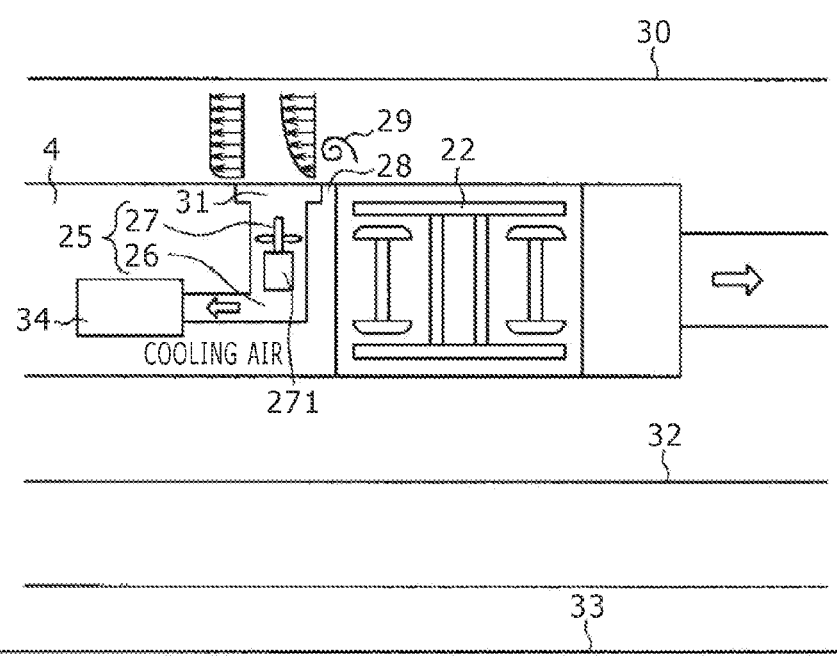
FIG. 8 is a partially enlarged view showing the details of a bogie and its surroundings of the railway vehicle.
Figure 9:
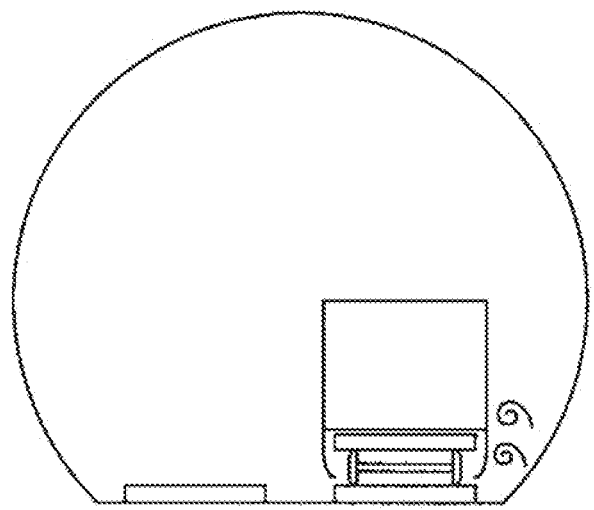
FIG. 9 is a diagram for comparison between vehicle-body lateral responses in a tunnel section and a non-tunnel section of a railway vehicle in the related art.
Figure 10:
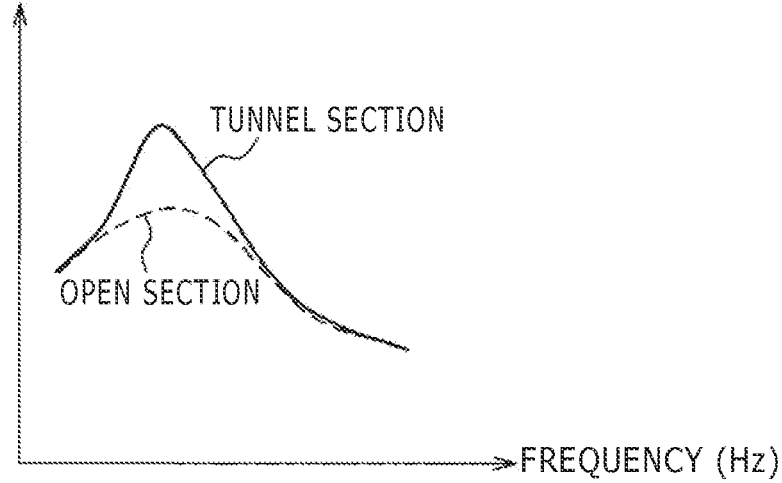
FIG. 10 is a diagram explaining an overview of the influence of a translational force caused by a vortex on vehicle body vibration in the related art.

Also in the vehicle equipped with the flow control devices 25 according to the second embodiment, as shown in FIG. 8, when the vehicle is traveling toward the right side of the drawing sheet, a vortex 29 generated by collision of air with a portion 28 of a cover 24 is sucked by one of the flow control devices 25, and thus the same advantage as the above-described first embodiment can be obtained. Also, although not shown here, if, on the other hand, the vehicle travels toward the left side of the drawing sheet, a vortex generated by collision of air with a portion of the cover 4 on a side surface of the vehicle on the opposite side is sucked by the other flow control device 25, and thus the same advantage can be obtained.

On the other hand, in the second embodiment, unlike the above-described first embodiment, the exhaust port of the L-shaped duct 26 is disposed so as to face the underfloor device 34. Thus, the vortex 29 to be sucked into the duct and then discharged from the exhaust port can be utilized as cooling air for the underfloor device 34. Here, any of a main transformer, a main converter, a main electric motor of the bogie, etc. may be used as the underfloor device 34. And further, the cooling effect can be more effectively obtained by extending the exhaust port to the vicinity of the underfloor device serving as an object to be cooled.

In addition, a difference in pressure between the intake and exhaust ports of the vehicle side surface is obtained by connecting the exhaust port of the L-shaped duct 26 to a portion under a pressure below atmospheric pressure, thereby allowing generation of the flow of air from the intake port to the exhaust port without driving the pressure control device 27. Consequently, a pressure difference caused by the pressure control device 27 is reduced, thereby allowing a reduction in drive energy. Also, in the case where there is no need for driving the device, installation of the device is unnecessary, thereby allowing a reduction in the driving energy for driving the device.

It should be noted that in this second embodiment, particularly, there is no need for controlling the rotating direction of the electric motor for rotating the rotating shaft of the pressure control device 27 at a high speed, and it is only necessary to drive just one motor of the pair of electric motors when the railway vehicle passes through the tunnel.

As described in detail above, according to the vehicle vibration suppression device of the present invention, with the construction of the above-described first or second embodiment, it is possible to achieve the following advantages in the railway vehicle: (1) the intake port of the flow control device is disposed in the vehicle side surface on the wall side of the tunnel, thereby allowing suction of a vortex generated on the wall side of the tunnel, which causes vehicle body vibration, and reduction in vortex; (2) the speed of movement in the vehicle traveling direction of the vortex generated on the wall side of the tunnel can be increased, and the speed of movement of a translational force in the railroad tie direction on the side surface of the vehicle can be increased, the sum of the yaw moments about the center of gravity of the vehicle body due to the translational force can be reduced; and (3) the flow control device is disposed below the floor surface where the vortex is generated, only at a position close to the bogie in the vehicle longitudinal direction as possible, thereby allowing a reduction in the number of necessary devices.

LIST OF REFERENCE SIGNS 1, 21 Vehicle body
2, 22 Bogie
3, 23 Body structure
4, 24 Cover
5, 25 Flow control device
6, 26 Duct
7, 27 Pressure control device
9, 29 Vortex
10, 13, 30, 33 Wall surface of a tunnel
12, 32 Track
34 Underfloor device

The invention claimed is:

1. A vehicle vibration suppression device for suppressing vibration of a vehicle body generated when a railway vehicle passes through a tunnel, comprising:
   a pair of ducts below a floor surface of the vehicle body, the pair of ducts being mounted adjacent to at least a pair of bogies on which the vehicle body is mounted, the ducts being arranged in a direction perpendicular to a traveling direction of the vehicle body and mounted so as to penetrate through both side surfaces of the vehicle body;
   a pressure control device mounted within each of the ducts, the pressure control device having openings, one of the openings serving as an intake port and the other opening serving as a discharge port, the pressure control device being configured to generate a pressure difference in each of the ducts; and
   a control unit for controlling start and stop of suction performed by the pressure control device while determining a side surface of the vehicle to be subjected to the suction by the pressure control device on the basis of current distance information of the railway vehicle during currently traveling,
   wherein the control unit suppresses vibration by driving the pressure control device and sucking a vortex caused by turbulence of air flow generated at a portion of the bogie when the railway vehicle passes through the tunnel.

2. The vehicle vibration suppression device according to claim 1, wherein the control unit includes means for preliminarily processing and storing in a database information on a side surface of the vehicle to be subjected to suction operation by the pressure control device along with distance information of a tunnel section, and determines a side surface of the vehicle to be subjected to the suction when the railway vehicle passes through the tunnel and controls start and stop of the suction by collating the current distance information with the information processed into the database.

3. The vehicle vibration suppression device according to claim 2, wherein the pressure control device is composed of a plurality of blades mounted around a rotating shaft and includes an electric motor for rotationally driving the rotating shaft.

4. The vehicle vibration suppression device according to claim 3, further comprising:
   a drive circuit for controlling rotational drive of the electric motor,
   wherein the control unit determines a side surface of the vehicle to be subjected to suction operation by the pressure control device and controls start and stop of the suction by controlling a rotating direction of the electric motor with the drive circuit.

5. A vehicle vibration suppression device for suppressing vibration of a vehicle body generated when a railway vehicle passes through a tunnel, the vehicle having an underfloor device disposed under a floor of the vehicle body, the underfloor device requiring cooling comprising:
   a pair of ducts below a floor surface of the vehicle body, the pair of ducts being mounted adjacent to at least a pair of bogies on which the vehicle body is mounted, one of the ducts having openings, one opening being mounted to one side surface of the vehicle body and the other opening being mounted so as to face the underfloor device disposed under the floor of the vehicle body, the other duct having openings, one opening being mounted to the other side surface of the vehicle body and the other opening being mounted so as to face the underfloor device disposed under the floor of the vehicle body;
   a pressure control device mounted within each of the ducts for generating a pressure difference in each of the ducts; and
   a control unit for controlling start and stop of suction performed by the pressure control device while determining a side surface of the vehicle to be subjected to the suction by the pressure control device on the basis of current distance information of the railway vehicle during currently traveling,
   wherein the control unit suppresses vibration by driving the pressure control device and sucking a vortex caused by turbulence of air flow generated at a portion of the bogie when the railway vehicle passes through the tunnel.

6. The vehicle vibration suppression device according to claim 5, wherein the control unit includes means for preliminarily processing and storing in a database information on a side surface of the vehicle to be subjected to suction operation by the pressure control device along with distance information of a tunnel section, and determines a side surface of the vehicle to be subjected to the suction when the railway vehicle passes through the tunnel and controls start and stop of the suction by collating the current distance information with the information processed into the database.

7. The vehicle vibration suppression device according to claim 6, wherein the pressure control device is composed of a plurality of blades mounted around a rotating shaft and includes an electric motor for rotationally driving the rotating shaft.

8. The vehicle vibration suppression device according to claim 7, further comprising:
   a drive circuit for controlling rotational drive of the electric motor,
   wherein the control unit determines a side surface of the vehicle to be subjected to suction operation by the pressure control device and controls start and stop of the suction by controlling start and stop of the electric motor with the drive circuit.

* * * * *